United States Patent [19]

Maris et al.

[11] Patent Number: 5,540,983
[45] Date of Patent: Jul. 30, 1996

[54] CONVEYOR BELTS DERIVED FROM COMPOSITIONS COMPRISING VINYL AROMATIC-CONJUGATED DIENE BLOCK COPOLYMERS

[75] Inventors: Catherine A. L. Maris; Peter Migchels; Hans F. Vermeire, all of Louvain-La-Neuve, Belgium

[73] Assignee: Shell Oil Company, Houston, Tex.

[21] Appl. No.: 509,807

[22] Filed: Aug. 1, 1995

Related U.S. Application Data

[62] Division of Ser. No. 409,295, Mar. 23, 1995, abandoned.

[30] Foreign Application Priority Data

Mar. 25, 1994 [EP] European Pat. Off. .............. 94200799

[51] Int. Cl.⁶ .......................... B32B 27/08; B32B 27/22
[52] U.S. Cl. ................. 428/265; 428/245; 428/290; 198/951; 525/72; 525/78; 525/98; 525/99
[58] Field of Search ..................... 428/245, 265, 428/290; 198/957; 525/72, 78, 98, 99

[56] References Cited

U.S. PATENT DOCUMENTS

| | | | |
|---|---|---|---|
| 4,359,551 | 11/1982 | Suda | 524/211 |
| 4,623,574 | 11/1986 | Harpell et al. | 428/113 |
| 4,785,043 | 11/1988 | Kawai | 524/272 |
| 4,898,784 | 2/1990 | Sauders | 428/412 |
| 4,994,508 | 2/1991 | Shiraki | 524/14 |
| 5,002,997 | 3/1991 | Gelles et al. | 524/505 |
| 5,149,741 | 9/1992 | Alper | 525/95 |
| 5,331,038 | 7/1994 | Dillman | 524/505 |
| 5,342,858 | 8/1994 | Litchholt | 521/98 |

FOREIGN PATENT DOCUMENTS

| | | |
|---|---|---|
| 0322055 | 12/1988 | European Pat. Off. . |
| 518444A1 | 6/1991 | European Pat. Off. . |
| 58-191128A | 5/1982 | Japan . |
| 2181670 | 10/1985 | United Kingdom . |
| 95/03447 | 2/1995 | WIPO . |

*Primary Examiner*—Irena Zemel

[57] ABSTRACT

Conveyor belt, obtainable by application of a block copolymer composition, comprising at least an optionally modified block copolymer, containing at least two terminal poly(vinylaromatic) blocks and at least one internal poly(conjugated diene) block, a non-aromatic plasticizing oil, and a terminal block compatible resin on at least one side of a fabric having from 5 to 25 threads per cm and process for the manufacture of it, while the threads in said fabric have a thickness in the range of from $2\mu$ to $300\mu$.

8 Claims, No Drawings

5,540,983

CONVEYOR BELTS DERIVED FROM COMPOSITIONS COMPRISING VINYL AROMATIC-CONJUGATED DIENE BLOCK COPOLYMERS

This is a division of application Ser. No. 08/409,295, filed Mar. 23, 1995, abandoned.

FIELD OF THE INVENTION

The invention is relating to conveyor belts, at least one outside layer of which has been derived from compositions comprising vinyl aromatic-conjugated diene block copolymers and more in particular styrene-butadiene and/or styrene-isoprene block copolymers respectively, to block copolymer compositions to be used and to the process for the manufacture of said conveyor belts.

BACKGROUND OF THE INVENTION

Conveyor belts for a variety of applications are at present almost exclusively manufactured of plasticized polyvinylchloride (PVC) or polyurethanes (TPU) in combination with one or more polyester (PET) or polyamide (PA) fabrics as support. Said belts are primarily used in the food industry and the business/services area.

The manufacture of said belts has up to now been carried out as a straightforward process in which PVC is applied to the base fabric as a plastisol, whereas polyurethanes are applied as powders.

In both cases fusion is achieved at about 200° C. during a short period in an oven, in general less than 1 minute, resulting in a bonding of the produced polymer sheet to the fabric of more than 2 N/mm and preferably of more than 3 N/mm as determined by a T-peel test.

However for reasons of required recyclability of these belts, high dirt pick-up of certain types and restricted use at low temperatures down to −40° C., there has grown a strong need for alternative materials.

Therefore the primary object of the present invention is to provide such alternative conveyor belts, which have to be completely recyclable without any significant charge to environment due to production of toxic byproducts during recycling.

More in particular, the primary object of the invention is to provide such alternative conveyor belts, which are coated on at least one side of the fabric with an adequately bonded polymer layer (i.e. >1.0 N/mm) and preferably >1.3 N/mm, other than the presently used objected ones, and which, moreover, show a lateral stability i.e. a stability perpendicular to the direction of transportation of goods, and required abrasion resistance and hardness of the coating layer.

It will be appreciated that this aim could not be reached by using e.g. EPDM or TPU containing compositions when using the conventional application methods, such as extrusion/coating, or reversed roll-coating.

Moreover, it was generally known that for conventional conveyor belts to be produced from a latex of SBR (random vinyl aromatic/conjugated diene rubber) and fabric, the fabric threads had preferably been precoated with e.g. a resorcinol-formaldehyde latex, in order to obtain sufficient adhesion.

Moreover, it will be appreciated that such SBR or EPDM comprising conveyor belts have to be vulcanized by heat treatment in its final form.

SUMMARY OF THE INVENTION

The conveyor belts of the present invention, are obtainable by means of the application of a block copolymer composition, comprising at least:
(a) a block copolymer, containing at least two terminal poly(vinyl aromatic) blocks and at least one internal poly(conjugated diene) block, said block copolymer optionally being modified by grafting polar moieties on it,
(b) a non-aromatic plasticizing oil, and
(c) a terminal block compatible resin; on at least one side of a fabric having from 5 to 25 threads per cm in both directions, preferably 10 to 20 threads per cm and more preferably 15 to 18 threads per cm, i.e. (15–18)*(15–18) threads/cm² of fabric, while the threads in said fabric have a thickness in the range of from 20μ to 300μ and preferably from 100μ to 300μ.

DETAILED DESCRIPTION OF THE INVENTION

The conveyor belts of the present invention, are obtainable by means of the application of a block copolymer composition, comprising at least:
(a) a block copolymer, containing at least two terminal poly(vinyl aromatic) blocks and at least one internal poly(conjugated diene) block, said block copolymer optionally being modified by grafting polar moieties on it,
(b) a non-aromatic plasticizing oil, and
(c) a terminal block compatible resin; on at least one side of a fabric having from 5 to 25 threads per cm in both directions, preferably 10 to 20 threads per cm and more preferably 15 to 18 threads per cm, i.e. (15–18)*(15–18) threads/cm² of fabric, while the threads in said fabric have a thickness in the range of from 20μ to 300μ and preferably from 100μ to 300μ.

The coating density of the hot melt composition in the conveyor belts of the present invention is in the range from 0.5 to 3 g/cm² and preferably in the range of from 1 to 2 g/cm².

It will be appreciated that conveyor belts according to the present invention may be obtained by coating one or both sides of a starting fabric with the same or different block copolymer compositions. Moreover, conveyor belts constituted by more than one fabric layer in a sandwich structure, coated on the outer surfaces and between the fabric layers with a block copolymer composition, are meant to be covered by the present invention.

Another aspect of the present invention is formed by block copolymer compositions, suitable for the manufacture of conveyor belts, and comprising at least:
(a) a block copolymer, containing at least two terminal poly(vinylaromatic) blocks and at least one internal poly(conjugated diene) block, said block copolymer optionally being modified by grafting polar moieties on it,
(b) a non-aromatic plasticizing oil, and
(c) a terminal block compatible resin.

Said block copolymer compositions can be applied in the form of a hot melt or in the form of a powder which can be subsequently fused into a continuous layer by heat treatment.

The block copolymers which have been found to be suitably applied, preferably are linear triblock copolymers or multi-armed (more than 2 arms) radial or star shaped block copolymers, the blocks of which have been predominantly derived from styrene and butadiene or isoprene respectively, such as CARIFLEX TR block copolymers.

With the term "predominantly derived from" is meant that the main monomer of the respective individual blocks optionally may be mixed with minor amounts of another comonomer and more in particular with minor amounts of the main monomer of the other blocks.

Examples of the vinyl aromatic monomers may be selected from styrene, -methylstyrene, p-methylstyrene, m-methylstyrene, o-methylstyrene, p-tert-butylstyrene, dimethylstyrene, vinylnaphthalene and the like and mixtures thereof and conjugated diene monomers may be selected from butadiene, isoprene, piperylene and the like, and mixtures thereof.

Of these monomers styrene and butadiene or isoprene or mixtures thereof are preferred. Most preferred block copolymers are those which only contain substantially pure poly(styrene) blocks and substantially pure poly(butadiene) or poly(isoprene) blocks.

Examples of such block copolymers which can be suitably used are CARIFLEX TR block copolymers (CARIFLEX is a trade mark). More preferably CARIFLEX TR-4113 or CARIFLEX TR KX158 block copolymers are used.

The block copolymers to be used as component (a) of the block copolymer composition may optionally be modified by grafting to them a polar entity, such as carboxylic acids or derivatives thereof, epoxy compounds, silane compounds, amines or amides. More preferred representatives of block copolymers, whereof the poly(conjugated diene) blocks have been grafted with unsaturated acid derivatives are known from e.g. British patent application No. 2,053,238.

It will be appreciated that also mixtures of unmodified block copolymers and of modified (preferably structurally related) block copolymers can be used as component (a).

Application of such mixtures of functionalized and non functionalized block copolymers have been found to provide an additionally improved bonding e.g. at least 1.0 N/mm.

In such mixtures the weight ratios of the unmodified and modified block copolymers components can vary in the range of from 99/1 to 40/60 and preferably in the range of from 90/10 to 50/50.

The terminal blocks in the block copolymers have usually number average molecular weights ranging from 3,000 to 100,000, preferably from 5,000 to 20,000, and the internal poly(conjugated diene) blocks usually have apparent number average molecular weights (polystyrene scale) in the range of from 10,00 to 300,000 and preferably from 30,000 to 100,000. The poly(conjugated diene) blocks usually contain from 5 to 50 mol %, relative to the conjugated diene molecules, of side groups originating from 1,2 polymerization.

The complete block copolymer to be used according to the present invention, is normally containing bound vinyl aromatic in an amount of from 30 to 60% by weight and preferably from 35 to 48% by weight. The apparent number average molecular weight of the total block copolymer will normally be in the range of from 20,000 to 350,000 and preferably in the range of from 40,000 to 200,000 as measured by gel permeation chromatography using polystyrene standards.

As component (b) various plasticizing oils are useful in the compositions to be used according to the present invention.

It will be appreciated that as component (a) also oil containing block copolymer compositions may be used instead of pure block copolymer(s), the added amount of oil of which may be compensated via the component (b) amount.

Plasticizing oils which have been found useful include petroleum derived oils, olefin oligomers and low molecular weight polymers, as well as vegetable and animal oil and their derivatives.

The petroleum derived oils which may be employed are relatively high boiling materials, containing only a minor proportion of aromatic hydrocarbons preferably less than 20 percent and more preferably less than 15 percent by weight of the oil most preferably the oil may be totally non-aromatic. The oligomers may be polypropylene, polybutenes, hydrogenated polyisoprene, hydrogenated polybutadiene, polypiperylene and copolymers of piperylene and isoprene, having number average molecular weights between 350 and 10,000.

Vegetable and animal oils include glyceryl esters of the usual fatty acids and polymerization products thereof.

Examples of a preferred paraffinic oil are PRIMOL 352 (PRIMOL is a trade mark) Exxon EZL675 Oil and the NAPVIS and HYVIS (trade marks) polyolefins, having a weight average molecular weight in the range of from 500 to 6,000. Preferably amounts of from 10 to 50 parts by weight per 100 parts by weight of block copolymer are applied and preferably from 25 to 40 parts by weight per 100 parts by weight of block copolymer.

As component (c) various terminal block compatible resins are useful in the compositions used according to the present invention.

Examples of the terminal poly(vinyl aromatic) block modifying resins include coumarone-indene resin, polyphenylene ethers and more particularly poly(2,6-dimethyl-1,4-phenylene ether), polystyrene resin, vinyltoluene-alphamethylstyrene copolymer resin, polyindene resin, or poly(methyl indene) resin.

Examples of such commercial resins are HERCURES HM 100, ENDEX 160, KRISTALEX F 120, KRISTALEX F 5140, NEVCHEM NL 140 and PICCOTEX 120. (HERCURES, ENDEX, KRISTALEX, NEVCHEM and PICCOTEX are trade marks).

Amounts of from 1 to 40 parts by weight of said terminal block modifying resin per 100 parts by weight of block copolymer are applied, and more preferably from 5 to 30 parts by weight.

Preferred modifying resins are optionally toughened polystyrene resins and/or polyphenylene ethers. More preferably toughened polystyrene resins are used, such as BASF TPS 476 POLYSTYROL.

The starting fabric may be based on a variety of synthetic or natural yarns, such as polyester (PET or PBT), polyamides, poly(ethylene), aramide, cotton, flax, of which polyester fabrics are preferred.

More preferably PET fabrics are used, which have long straight, relatively thick threads or filaments (e.g. 300 ) in the main direction and thinner corrugated threads or filaments in the longitudinal direction (e.g. 100). The fabric threads or filaments may have been pretreated with resorcinal-formaldehyde latex. Said fabrics have been found to provide an increased bonding to the vinyl aromatic/conjugated diene block polymer hot melt composition.

Moreover, it has been found that PET fabrics with cut filaments, giving a rough surface to the fabric, give the strongest bonding as compared with those of PET fabric with long (uncut) filaments.

It will be appreciated that the block copolymer composition may optionally contain, in addition to the three before-mentioned main components one or more auxiliary agents such as stabilizers, fillers, colouring agents, slip agents, and additional thermoplastic polymers, such as polyethylene and preferably LLDPE, polypropylene, ethylene vinyl acetate copolymers and the like.

The stabilizers or antioxidants optionally used in accordance with the practice of the present invention include high molecular weight hindered phenols and multifunctional phenols such as sulphur and/or phosphorus containing phenols. Hindered phenols are well known to those skilled in the art and may be characterized as phenolic compounds, "which also contain sterically bulky radicals in close proximity to the phenolic hydroxyl group thereof". In particular tertiary butyl groups or amyl groups generally are substituted onto the benzene ring in at least one of the ortho positions relative to the phenolic hydroxy group.

Representatives of such stabilizers are commercially available under the trade marks SUMILIZER and IRGANOX, e.g. SUMILIZER GM and GS, IRGANOX 1010.

As additional auxiliaries, inorganic and organic fillers can be used, which are well known in the art. Examples of such fillers include calcium carbonate, aluminium silicate, clay, talc titanium dioxide, bentonites, kaolin, barytes, mica, silica, barium sulfate or mixtures thereof. A preferred example of an inorganic filler is marketed under the trademark MILLICARB.

It has been surprisingly found that when applying the block copolymer composition on at least one side of a fabric according to the present invention by one step processing techniques, such as extrusion-coating of a hot melt composition or fusion of applied powdered compositions, conveyor belts could be obtained, showing a very good bonding of the polymer composition to the fabric and in particular to the polyester fabric of 1.0 N/mm or more, due to the low melt viscosity (high melt flow) of these finally applied melt compositions, enabling a better penetration of the fabric, giving rise to excellent 180T-peel strength.

On the other hand the conveyor belts, obtainable according to the present invention were found to show an attractive flexibility in combination with a required abrasion resistance, (DIN abrasion <290 mm$^3$) and hardness (Shore A hardness >30).

It will be appreciated that another aspect of the present invention is formed by the process for manufacturing conveyor belts, comprising the application of the block copolymer composition as specified hereinbefore on at least one side of a fabric to form a coating layer having a thickness in the range of from 0.5 to 5 mm and preferably from 1 to 3 mm in the form of a hot melt composition or in the form of a powder layer.

The application of the hot melt may take place by means of usual application techniques and more in particular by an extrusion-coating step, using a three roll take off to compress sheet and fabric, applying a temperature of at least 100° C. and preferably 140° C. of the hot extruded sheet.

It will be appreciated that according to another aspect of the present invention, the block copolymer compositions as hereinbefore specified can also be applied as a fine powder, e.g. obtained by cryogenic milling (as specified in the copending European patent application No. 93203636.1 filed Dec. 22, 1993), into a suitable layer and subsequent heating said layer by e.g. IR irradiation to achieve a continuous layer.

According to an alternative embodiment of this application aspect, the finally desired block copolymer layer may be built up by a combination of hot melt application and a fine powder application/fusing of the particles.

From U.S. Pat. No. 4,623,574 ballistic resistant composite articles were known, which articles comprised a network of high strength fibers which individually were coated with an elastomeric matrix material.

From British patent application No. 2181670 were known tubular lining materials for pipelines, having warps and wefts of threads of intertwisted filament yarns and speen yarns of synthetic fibres and a coating of a blend of polyethylene and styrene-ethylene-butylene, penetrating into the interstices of the fabric structure.

However, no technical teaching leading to the conveyor belts of the present invention, can be derived from these publications.

The invention will be further illustrated by the following examples, however, without restricting its scope to these embodiments.

EXAMPLE 1

Hot melt composition 1, (see Table) containing 100 parts by weight of CARIFLEX TR-KX158 block copolymer and having a melt flowrate of 15 g/10 min. at 190° C./2.16 kg, was applied to a PET fabric, containing 18*18 threads/cm$^2$ and each having an average thickness of about 100μ by means of an extrusion coating process. The experiments were carried out on a BRABENDER single screw extruder, L/D=30 provided with a slit-die of 10 cm width and a die gap of about 1 mm. The hot extruded sheet (melt temperature in the die 155° C.) was immediately applied on the fabric and wound up via a three roll "take off" unit.

In this unit the lower and upper roll were movable and connected via springs to the fixed middle roll, therewith providing some compression of the sheet and the fabric.

The distance between the rolls was set to about 1.5 mm. The temperature of the first two rolls was 80° C., while the third roll had a temperature of about 15° C. By means of this equipment a sheet of about 1 mm was applied to the fabric in a continuous way.

The threads of the PET fabric were made up of short(cut) filaments to improve the bonding. The bonding force between the composition and the PET fabric was determined by means of a T-peel test according to ASTM D 1876. For all samples measured cohesive failure was found which means that the bonding force is at least 1.3 N/mm.

EXAMPLE 2

Hot melt composition 2, containing a block copolymer grade as specified in the Table was applied in the same way as described in Example 1 to the same PET fabric. The bonding between the composition and the fabric was found to be at least 1.3 N/mm according to the herein before mentioned method.

EXAMPLE 3

Hot melt composition 3, containing the same ingredients as composition 1 with additionally 100 parts of MILLICARB giving it a melt flow rate (M FR) of 17 g/10 min at 190° C./2.16 kg, was applied to the same type of fabric and in the same way as described in Examples 1 and 2.

The bonding of the sheet to the fabric was determined by means of a T-peel test according to ASTM D 1876. For all samples measured cohesive failure was found, which means that the bonding force is at least 1.3 N/mm.

| Composition* | | 1 | 2 |
|---|---|---|---|
| CARIFLEX TR KX158 | | 100 | |
| CARIFLEX TR-4113 | | | 100 |
| Toughened Polystyrene 476 | | 5 | 30 |
| Oil (EZL 675) | | 30 | 20 |
| MFR (190° C./2.16 kg) g/10 min. | | 15 | 17 |
| Hardness Shore A | 0 s. | 41 | 42 |
| | 30 s. | 38 | 39 |
| Tensile strength | Mpa | 4.5 | 4.1 |
| DIN Abrasion | mm³ | 195 | 288 |

*All compositions contain 3 parts by weight of KEMAMIDE E (trademark), 1 part by weight of $TiO_2$ and 1 part by weight of IRGANOX 1010 (trademark).

We claim:

1. Conveyor belts, obtainable by application of a block copolymer composition on at least one side of a fabric having from 5 to 25 threads per cm in both directions, while the threads in said fabric have a thickness in the range of from 20µ to 300µ, the block copolymer composition comprising:

a block copolymer, containing at least two terminal poly(vinylaromatic) blocks and at least one internal poly(conjugated diene) block, said block copolymer optionally being modified by grafting polar moieties on it, a non-aromatic plasticizing oil, and a terminal block compatible resin.

2. The conveyor belt according to claim 1, wherein the block copolymer composition is applied at a coating density in the range, of from 1 to 2 g/cm².

3. The conveyor belts according to claim 1, wherein the block copolymer composition is applied as a hot melt on the fabric.

4. The conveyor belts according to claim 1, wherein the block copolymer composition is applied as a finely divided powder, which is subsequently fused into a continuous layer by heat treatment.

5. The conveyor belts according to claim 1, wherein the fabric is a PET fabric which has long filaments or has been pretreated with a resorcinal-formaldehyde latex.

6. The conveyor belts according to claim 1, wherein the fabric is a PET fabric which has cut filaments, giving a rough surface to the fabric.

7. A process for manufacturing conveyor belts, comprising the steps of:

forming a block copolymer composition comprising:

a block copolymer, containing at least two terminal poly(vinylaromatic) blocks and at least one internal poly(conjugated diene) block, said block copolymer optionally being modified by grafting polar moieties on it;

a non-aromatic plasticizing oil; and a terminal block compatible resin; and applying the block copolymer composition on at least one side of a fabric to form a coating layer having a thickness in the range of from 0.5 to 5 mm and preferably of from 1 to 3 mm, the fabric having from 5 to 25 threads per cm in both directions, while the threads in said fabric have a thickness in the range of from 20µ to 300µ.

8. The process according to claim 7, wherein the block copolymer composition is applied as a hot melt by an extrusion-coating step using a three roll take off to compress sheet and fabric.

* * * * *